United States Patent
Ye et al.

(10) Patent No.: US 8,825,942 B2
(45) Date of Patent: Sep. 2, 2014

(54) APPARATUS AND METHOD OF REARRANGING DATA AND NONVOLATILE DATA STORAGE APPARATUS

(75) Inventors: Kyung-wook Ye, Seoul (KR); Jeong-uk Kang, Bucheon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 466 days.

(21) Appl. No.: 12/772,381

(22) Filed: May 3, 2010

(65) Prior Publication Data

US 2010/0293348 A1  Nov. 18, 2010

(30) Foreign Application Priority Data

May 13, 2009  (KR) .................. 10-2009-0041750

(51) Int. Cl.
 G06F 12/00 (2006.01)
 G06F 12/06 (2006.01)
 G06F 3/06 (2006.01)

(52) U.S. Cl.
 CPC .... G06F 12/0607 (2013.01); *G06F 2212/2022* (2013.01); G06F 3/0613 (2013.01); G06F 3/0679 (2013.01); G06F 3/064 (2013.01)

USPC ............... 711/103; 711/114; 711/E12.008; 713/100; 707/693; 707/736; 707/821

(58) Field of Classification Search
 CPC .................................................. G06F 13/1626
 USPC ................. 711/103, 114, E12.008; 713/100; 707/693, 736, 821
 See application file for complete search history.

(56) References Cited

U.S. PATENT DOCUMENTS

| | | | | |
|---|---|---|---|---|
| 5,664,187 A | * | 9/1997 | Burkes et al. | 711/114 |
| 2003/0221060 A1 | * | 11/2003 | Umberger et al. | 711/114 |
| 2004/0076044 A1 | * | 4/2004 | Nowshadi | 365/200 |
| 2005/0144361 A1 | * | 6/2005 | Gonzalez et al. | 711/103 |
| 2009/0049238 A1 | * | 2/2009 | Zhang et al. | 711/113 |
| 2009/0240678 A1 | * | 9/2009 | Sadovsky et al. | 707/5 |
| 2010/0011162 A1 | * | 1/2010 | Wang et al. | 711/114 |
| 2010/0251009 A1 | * | 9/2010 | Stenfort | 714/5 |

* cited by examiner

*Primary Examiner* — Edward Dudek, Jr.
(74) *Attorney, Agent, or Firm* — Stanzione & Kim, LLP

(57) ABSTRACT

A storage apparatus includes one or more memory units each having a plurality of memory blocks to store a file having data corresponding to a plurality of clusters, and a controller to store the file in the memory units such that such that the data of at least two sequential addresses of the clusters are stored in the memory blocks of different memory units.

20 Claims, 13 Drawing Sheets

Log #1: [0, 32] [100, 64] [200, 32] [300, 128] [800, 128]
Log #2: [200, 32] [300, 128] [800, 128] [1000, 128]
Log #3: [300, 32] [200, 32] [300, 128] [800, 128] [0, 32]

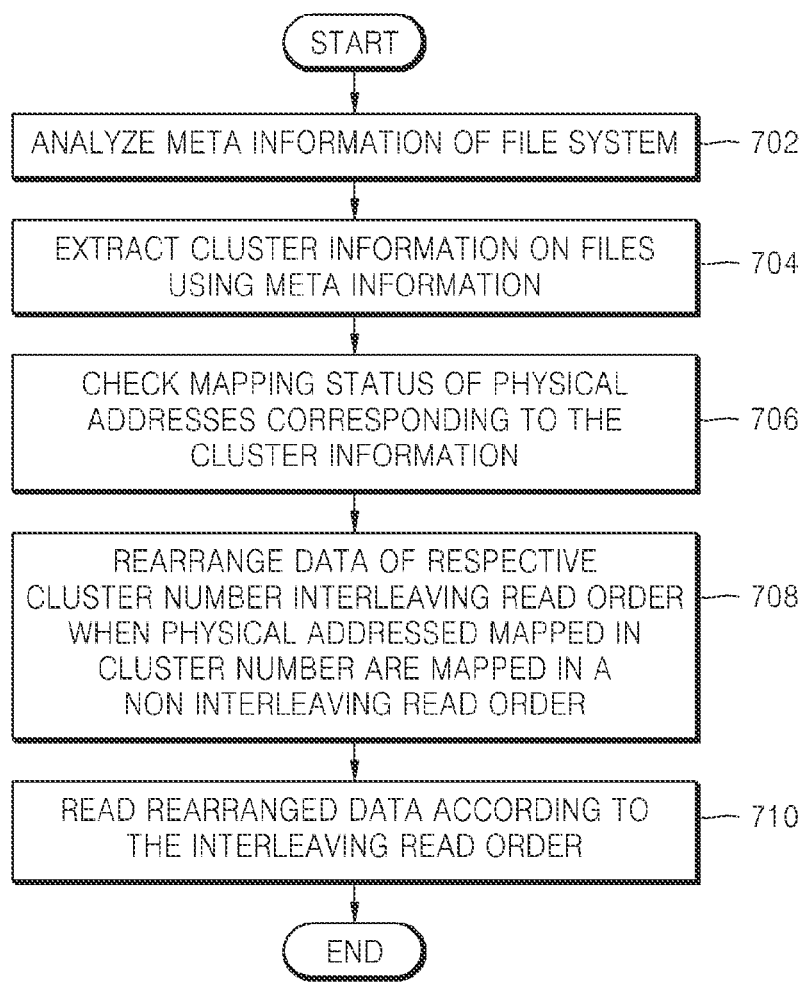

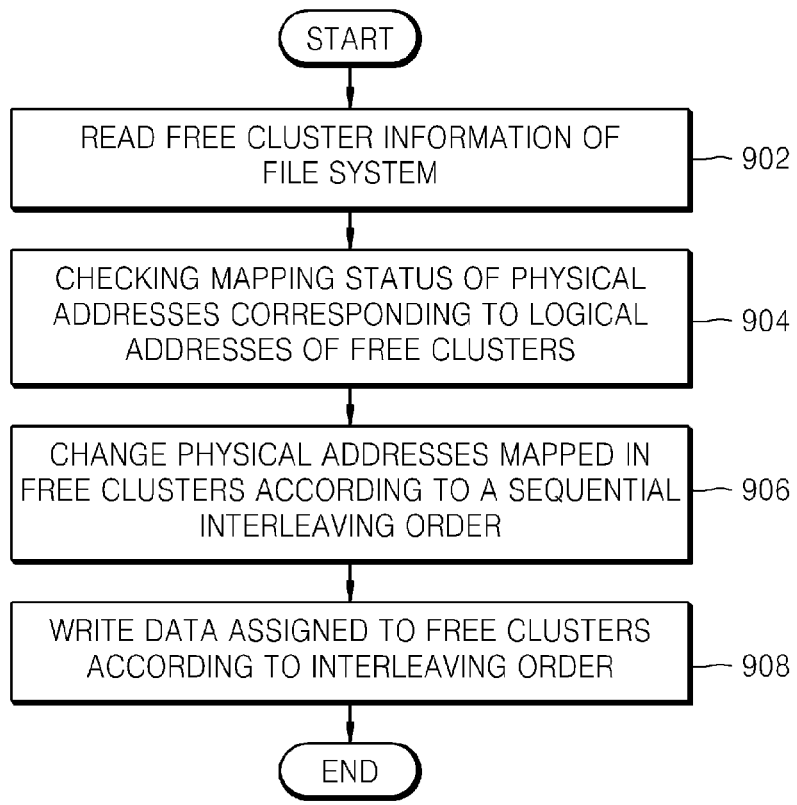
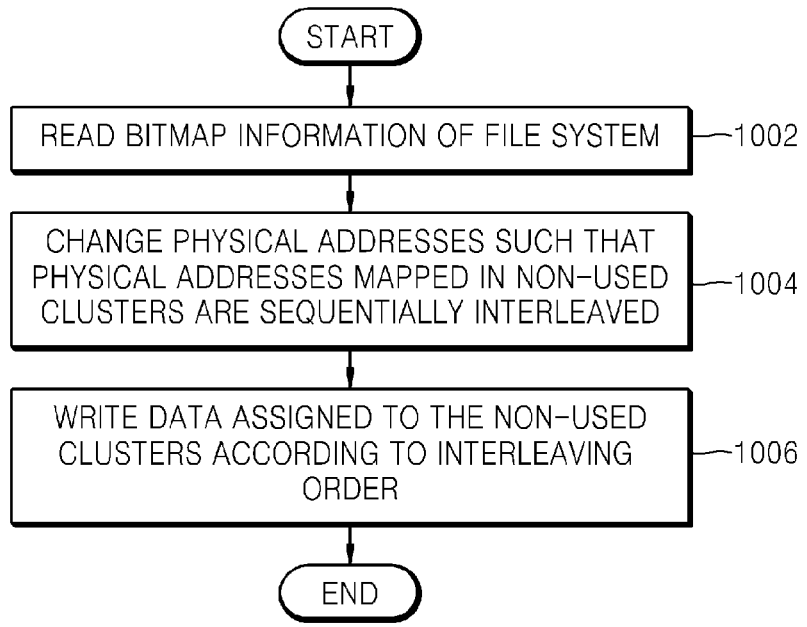

APPARATUS AND METHOD OF REARRANGING DATA AND NONVOLATILE DATA STORAGE APPARATUS

CROSS-REFERENCE TO RELATED APPLICATIONS

This application claims priority under 35 U.S.C. §119(a) from Korean Patent Application No. 2009-41750 filed with the Korea Industrial Property Office on May 13, 2009, the disclosure of which is incorporated herein by its reference.

BACKGROUND OF THE INVENTION

1. Field

The present general inventive concept relates to apparatus and method of rearranging data and storage apparatus to store the rearranged data, and more particularly, to apparatus and method of storing data in an interleaving method.

2. Description of the Related Art

A conventional host computer includes a plurality of memory units to store data. The memory units have a log area to temporarily store the data and a data area to store the temporarily stored data. The memory units are, for example, an HDD, a FDD, a DRAM, an SRAM, a flash memory, a flash EEPROM, etc. However, the data area and the log area are fixed within the memory units, causing a slow speed of the memory unit in reading and writing and a low performance of the host computer in processing.

SUMMARY

The present general inventive concept provides an apparatus and method of arrange data to provide an efficient writing and reading process.

The present general inventive concept provides a storage apparatus to store data in an interleaving method.

The present general inventive concept provides an apparatus and method of storing data to provide an area to store new data and to read the stored data in an improved speed.

The present general inventive concept provides an apparatus and method of storing new data in an area provided by rearranging data in a storage apparatus.

The present general inventive concept provides a computer readable medium containing computer readable medium as program to perform a method of writing and reading data stored according to an improved method.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a storage apparatus including one or more memory units each having a plurality of memory blocks to store a file having data corresponding to a plurality of clusters, and a controller to store the file in the memory units such that such that the data of at least two sequential addresses of the clusters are stored in the memory blocks of different memory units.

The foregoing and/or other aspects and utilities of the present general inventive concept may also be achieved by providing a storage apparatus including one or more memory units each having a plurality of memory blocks to store a file having data corresponding to a plurality of clusters, and a controller to store the file in the memory units such that such that the data of at least two sequential addresses of the clusters are not stored the memory blocks of a same memory unit of the memory units.

The foregoing and/or other aspects and utilities of the present general inventive concept may also be achieved by providing a storage apparatus including one or more memory units each having a plurality of memory spaces to store data, and a controller to rearrange the data of the memory spaces of the memory units in a predetermined order according to at least one of a user pattern and meta data of a file translation layer.

The foregoing and/or other aspects and utilities of the present general inventive concept may also be achieved by providing an electronic apparatus including a host apparatus to perform an operation using data, and a storage apparatus connectable to the host apparatus to store the data, the storage apparatus having one or more memory units each having a plurality of memory spaces to store data, and a controller to rearrange the data of the memory spaces of the memory units in a predetermined order according to at least one of a user pattern and meta data of a file translation layer.

The foregoing and/or other aspects and utilities of the present general inventive concept may also be achieved by providing a method of a storage apparatus, the method including storing a file having data corresponding to a plurality of clusters in one or more memory units each having a plurality of memory blocks such that the data of at least two sequential addresses of the clusters are stored in the memory blocks of different memory units.

The foregoing and/or other aspects and utilities of the present general inventive concept may also be achieved by providing a method of a storage apparatus, the method including storing a file having data corresponding to a plurality of clusters in one or more memory units each having a plurality of memory blocks such that the data of at least two sequential addresses of the clusters are not stored the memory blocks of a same memory unit of the memory units.

The foregoing and/or other aspects and utilities of the present general inventive concept may also be achieved by providing a method of storing data in a storage apparatus, the method including providing one or more memory units each having a plurality of memory spaces to store data, and rearranging the data of the memory spaces of the memory units in a predetermined order according to at least one of a user pattern and meta data of a file translation layer.

The foregoing and/or other aspects and utilities of the present general inventive concept may also be achieved by providing a method of storing data in a storage apparatus, the method including performing an operation using data in a host apparatus, and storing the data in a storage apparatus having one or more memory units each having a plurality of memory spaces to store data, and rearranging the data of the memory spaces of the memory units in a predetermined order according to at least one of a user pattern and meta data of a file translation layer in non-operation period of the host apparatus.

The foregoing and/or other aspects and utilities of the present general inventive concept may also be achieved by providing a computer readable medium to contain computer readable codes as a program to perform a method of storing data in a storage apparatus, the method including storing a file having data corresponding to a plurality of clusters in one or more memory units each having a plurality of memory blocks such that the data of at least two sequential addresses of the clusters are stored in the memory blocks of different memory units.

The foregoing and/or other aspects and utilities of the present general inventive concept may also be achieved by providing a computer readable medium to contain computer readable codes as a program to perform a method of storing data in a storage apparatus, the method including storing a file having data corresponding to a plurality of clusters in one or more memory units each having a plurality of memory blocks such that the data of at least two sequential addresses of the clusters are not stored the memory blocks of a same memory unit of the memory units.

The foregoing and/or other aspects and utilities of the present general inventive concept may also be achieved by providing a computer readable medium to contain computer readable codes as a program to perform a method of storing data in a storage apparatus, the method including providing one or more memory units each having a plurality of memory spaces to store data, and rearranging the data of the memory spaces of the memory units in a predetermined order according to at least one of a user pattern and meta data of a file translation layer.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 7 is a flowchart illustrating a method of improving a reading and/or writing operation in a non-volatile memory according to an embodiment of the present general inventive concept;

FIG. 9 is a flowchart illustrating a method of improving a reading and/or writing operation in a non-volatile memory according to an embodiment of the present general inventive concept;

FIG. 10 is a view illustrating a method of improving a reading and/or writing operation in a non-volatile memory according to an embodiment of the present general inventive concept;

DETAILED DESCRIPTION OF THE EMBODIMENTS

Figure 1A:
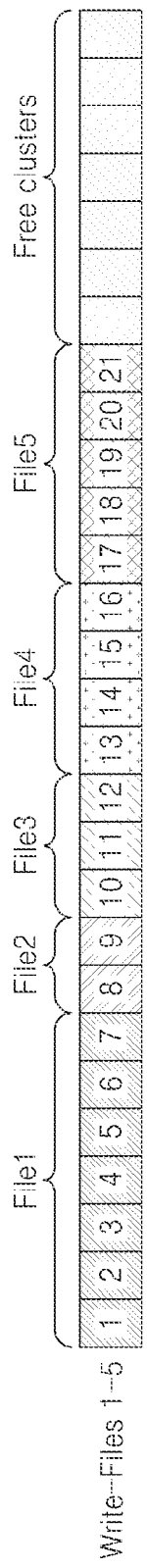
FIGS. 1A, 1B, and 1C are views illustrating a file system to perform fragmentation according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1B:
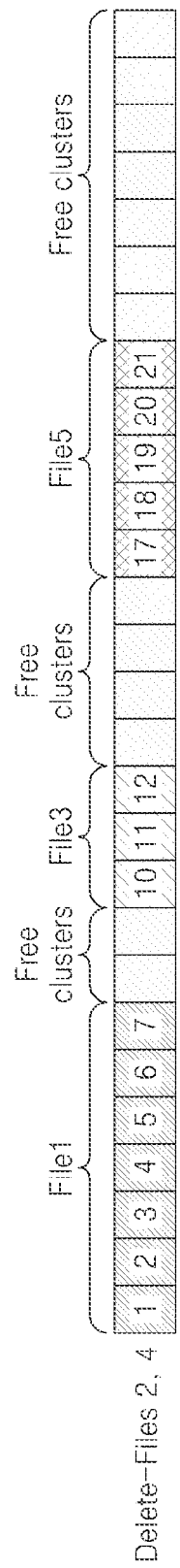
Figure 1C:
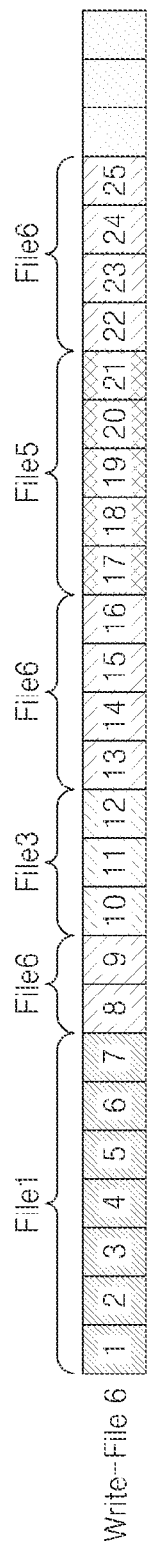

FIGS. 1A, 1B, and 1C are views illustrating a file system to perform fragmentation in a computing system according to an embodiment of the present general inventive concept.

Referring to FIG. 1A, the computing system may include a host apparatus and/or a storage apparatus. The file system may be formed in at least one of the host apparatus and the storage apparatus to perform the fragmentation in a memory unit of the host apparatus or in a memory unit of the storage apparatus according to an operation of controlling the memory unit for example, initializing the memory unit or writing, reading and/or deleting data on and/or from the memory unit. The file system may be formed when the host apparatus generates a command to store data in the storage apparatus or to read data from the storage apparatus.

When the electronic apparatus and/or the storage apparatus of the computing system is turned on or initialized to operate the file system, a formatting operation is performed in the memory unit and then a plurality of files, for example, first though fifth files (files 1-5) are stored (or written) in the memory unit. The first, second, third, fourth, and fifth files (files 1-5) are sequentially assigned to a plurality of clusters 1 through 21 to correspond to a file size or data amount of the respective files 1-5. The memory unit may include free clusters in which the files 1-5 are not stored as illustrated in FIG. 1A. When the files 2 and 4 are deleted, the clusters 8, 9 and 13-16 from which the files 2 and 4 are deleted becomes free clusters, as illustrated in FIG. 1B. When a new sixth file (file 6) is stored (or written) in the memory unit, non-sequential (non-consecutive) free clusters 8-9, 13-16, and 22-25 are assigned to store data of the sixth file (file 6) as illustrated in FIG. 1C.

The sixth file (file 6) stored in the file system as illustrated in FIG. 1C is divided and stored in a non-volatile memory corresponding to physical block addresses (PBA, hereinafter, physical addresses) of a non-volatile storage apparatus which is mapped with logical addresses of clusters. The sixth file (file 6) may be stored in the free clusters of FIG. 1B which may not be arranged in sequential order or consecutive order.

Figure 2A:
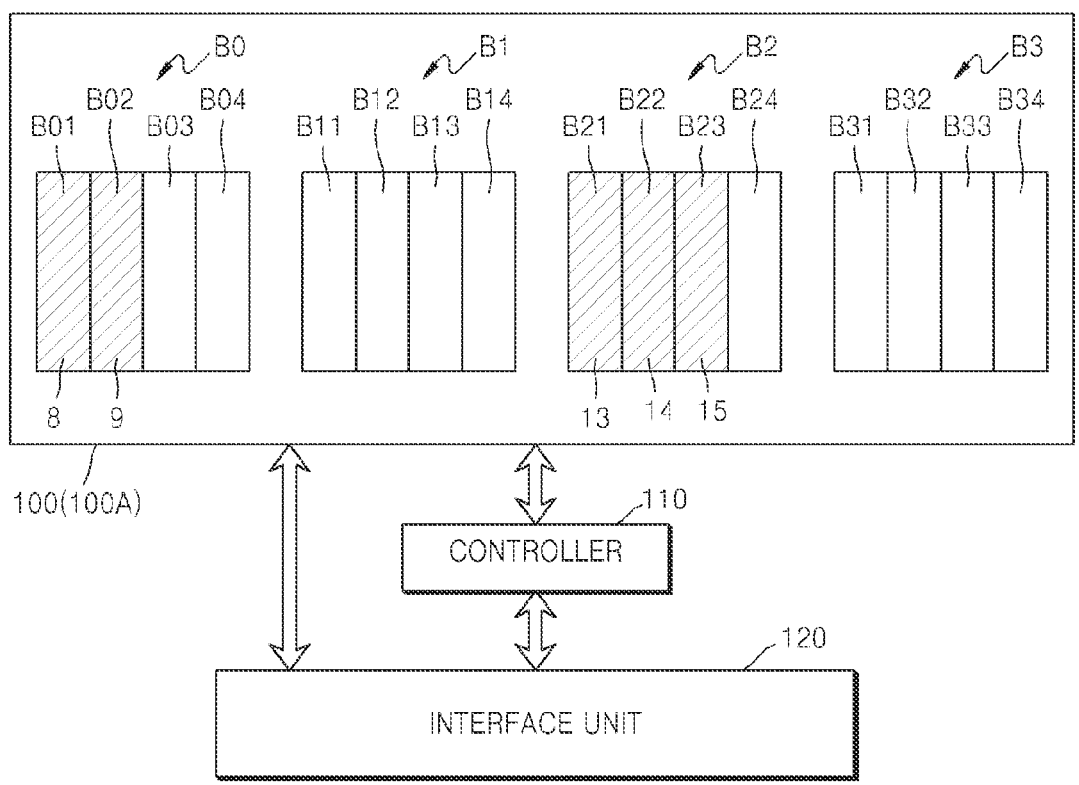
FIGS. 2A and 2B are views illustrating a storage apparatus to randomly store files of FIGS. 1A through 1C.
Figure 2B:
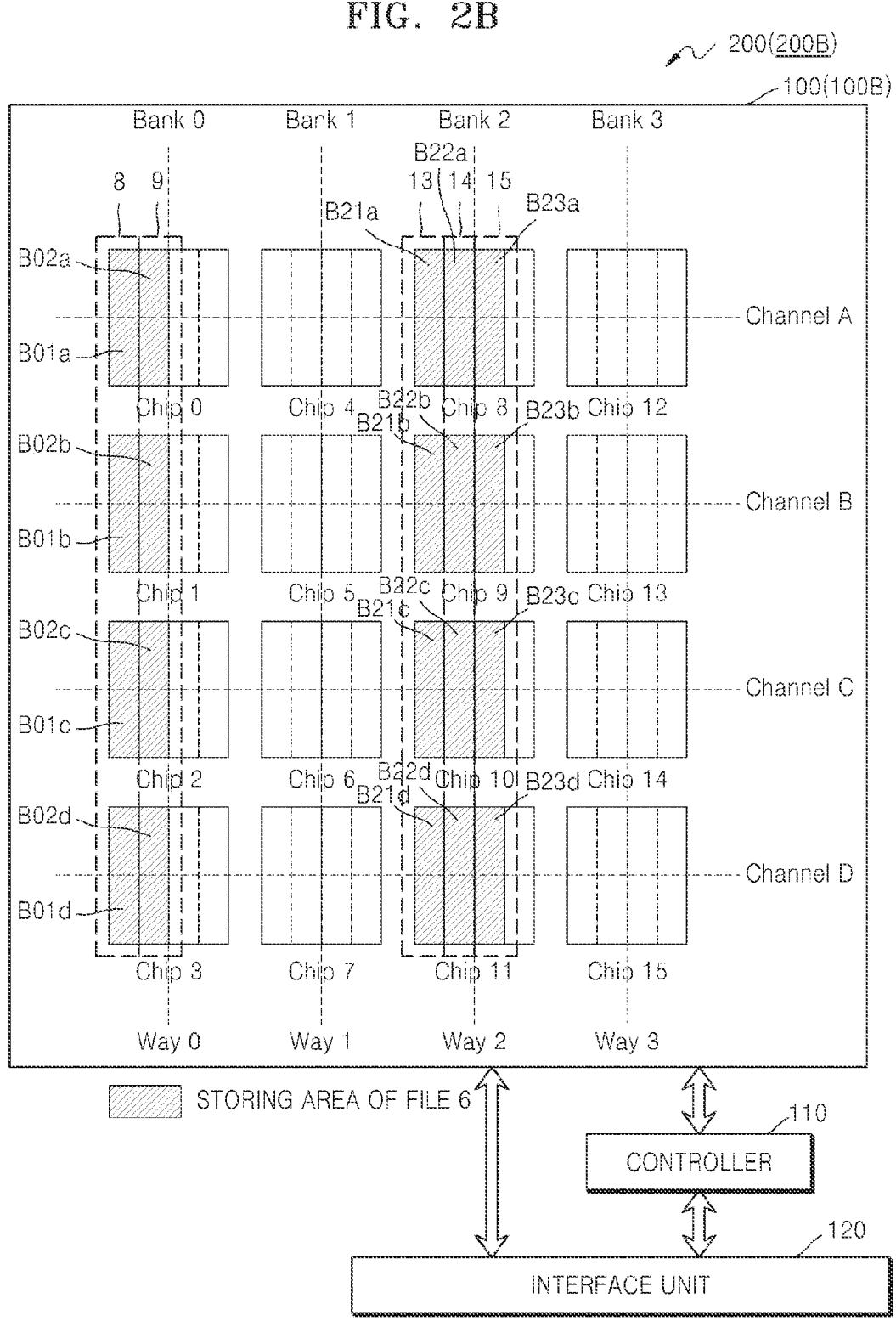

FIGS. 2A and 2B are views illustrating a storage apparatus 200 (200A) to store a file, for example, the sixth file (file 6) of FIG. 1C, in a non volatile memory unit.

Referring to FIG. 2A, the storage apparatus 200 (200A) may include a non-volatile memory unit 100 using a reading and writing method of one (1) channel/four (4) ways. The non-volatile memory unit 100 may store a large amount of data by using a bit width expanding method and a channel method. In the bit width expanding method, non-volatile memory chips, for example, four memory chips are connected to form a channel, and data stored in the memory chips are simultaneously transmitted from the memory chips through the channel A, which is referred to as one (1) channel/four (4) way (ways 0 through 3) architecture. The memory chips simultaneously perform a writing operation and/or a reading operation in response to one or more same low addresses. The memory unit 100 may be a plurality of semiconductor chips or a plurality of sections formed in a semiconductor chip to correspond to the number of banks (ways).

Each one of the ways may be a unit to read and write data, and the four ways (ways 0 through 3) may be formed as first through fourth banks (bank 0 through 3) of the non-volatile memory unit 100, respectively. The first bank (bank 0) may include a plurality of memory blocks, for example, MB0, MB1, MB2, and MB3. The corresponding memory blocks MB0 through MB3 included in the respective nonvolatile memory chips simultaneously perform a reading/writing operation according to a same column address. The corresponding memory blocks MB0 through MB3 included in the respective nonvolatile memory chips are mapped as the cluster as illustrated in FIGS. 1A, 1B, and 1C. Each page of the corresponding memory blocks MB0 through MB3 included in the respective nonvolatile memory chips is mapped in the cluster. The memory block MB0 corresponds to B01, B11, B21, and B31, the memory block MB1 corresponds to B02, B12, B22, and B41, the memory block MB2 correspond to B03, B13, B23, and B24, and the memory block MB3 correspond to B04, B14, B24, and B34.

The sixth file (file6) is stored in the first bank (bank 0) and the third bank (bank 2) of the non-volatile memory unit 100. The first and second memory blocks B01 and B02 (MB0 and MB1) of the first bank (bank 0) and the first, second, and third memory blocks B21, B22, and B23 (MB0, MB1, and MB 2) of the third bank (bank 2) are referred to as physical addresses of the non-volatile memory unit 100 which are mapped as physical addresses of the clusters 8-9 and 13-15 assigned to store the sixth file (file6) of the file system. When the sixth file (file6) is read from the non-volatile memory unit 100 written by a predetermined writing operation, the sixth file (file 6) can be read by a predetermined reading operation. The predetermined reading operation is performed at a slower reading speed than a sequential reading operation since the predetermined reading operation requires a wait signal with respect to access of the first and third banks bank0 and bank2. Even when the sixth file (file 6) has been stored according to the predetermined writing operation, the reading speed can be faster if the sixth file (file 6) is read according to a sequential reading operation.

For example, the reading operation of the sixth file (file 6) is performed to read the cluster 8 from the memory block B01, the cluster 9 from the memory blocks B02, the cluster 13 from the memory block B21, the cluster 14 from the memory block B22, and the cluster 15 from the memory block B23. However, the reading operation requires a waiting signal to read the data stored in stored in the memory blocks B21, B22, and B23 until reading from the cluster 8 and 9 corresponding to the memory blocks B01 and B02.

Referring to FIG. 2B, the storage apparatus may include a non-volatile memory unit 100 using a reading and writing method of four (4) channels/four (4) ways. The non-volatile memory unit 100 may store a large amount of data by using a bit width expanding method and/or a multiple channel method. In the bit width expanding method, non-volatile memory chips (Chip 0, Chip 4, Chip 8, and Chip 12) are connected to form a channel A, and data stored in the non-volatile memory chips (Chip 0, Chip 4, Chip 8, and Chip 12) are simultaneously transmitted from the non-volatile memory chips (Chip 0, Chip 4, Chip 8, and Chip 12) through the channel A, which is referred to as one (1) channel/four (4) way (ways 0 through 3) architecture. The non-volatile memory chips (Chip 0, Chip 4, Chip 8, and Chip 12) simultaneously perform a writing operation and/or a reading operation in response to one or more same low addresses. The multiple channel method is expanded from the one (1) channel/four (4) way (ways 0 through 3) architecture to form four (4) channel/four (4) way architecture. Although FIG. 2B illustrates four channels, it is possible that the number of channels may vary according to a design of the memory unit, a storage capacity of the memory unit, etc. Therefore, the number of semiconductor chips may vary according to the number of channels.

Each one of the ways may be a unit to read and write data in an interleaving method, and the four ways (ways 0 through 3) may be formed as first through fourth banks (bank 0 through 3) of the non-volatile memory unit 100, respectively. The first bank (bank 0) may include four volatile memory chips (chip 0, chip 1, chip 2, and chip 4) each having a plurality of memory blocks, for example, MB0, MB1, MB2, and MB3. The corresponding memory blocks MB0 through MB3 included in the respective nonvolatile memory chips (chip 0, chip 1, chip 2, and chip 4) simultaneously perform a reading/writing operation according to a same column address. The corresponding memory blocks MB0 through MB3 included in the respective nonvolatile memory chips (chip 0, chip 1, chip 2, and chip 4) are mapped as the cluster as illustrated in FIGS. 1A, 1B, and 1C. Each page of the corresponding memory blocks MB0 through MB3 included in the respective nonvolatile memory chips (chip 0, chip 1, chip 2, and chip 4) is mapped in the cluster.

The sixth file (file6) is stored in the first bank (bank 0) and the third bank (bank 2) of the non-volatile memory unit 100. The first and second memory blocks MB0 and MB1 of the first bank (bank 0) and the first, second, and third memory blocks MB0, MB1, and MB 2 of the third bank (bank 2) are referred to as physical addresses of the non-volatile memory unit 100 which are mapped as physical address of the clusters 8-9 and 13-15 assigned to store the sixth fine (file6) of the file system. When the sixth file (file6) is read from the non-volatile memory unit 100 written by a predetermined writing operation, the sixth file (file 6) can be read by a predetermined reading operation. The predetermined reading operation is performed at a slower reading speed than a sequential reading operation since the predetermined reading operation requires a wait signal with respect to access of the first and third banks bank0 and bank 2. Even when the sixth file (file 6) has been stored according to the predetermined writing operation, the reading speed can be faster if the sixth file (file 6) is read according to a sequential reading operation.

For example, the reading operation of the sixth file (file 6) is performed to read data stored in sub-memory blocks B01*a*, B01*b*, B01*c*, and B01*d* of the first memory block MB0 of the cluster 8, data stored in sub-memory blocks B02*a*, B02*b*, B02*c*, and B02*d* of the second memory block MB1 of the cluster 9, data stored in sub-memory blocks B21*a*, B21*b*, B21*c*, and B21*d* of the first memory block MB0 of the cluster 13, data stored in sub-memory blocks B22*a*, B22*b*, B22*c*, and B22*d* of the second memory block MB1 of the cluster 14, and data stored in sub-memory blocks B23*a*, B23*b*, B23*c*, and B23*d* of the third memory block MB2 of the cluster 15.

However, the reading operation requires a waiting signal to read the data stored in sub-memory blocks B02*a*, B02*b*, B02*c*, and B02*d* of the second memory block MB1 of the cluster 9 until the data is read from the sub-memory blocks B01*a*, B01*b*, B01*c*, and B01*d* of the first memory block MB0 of the cluster 8. Also, the reading operation requires a wait signal to read the data stored in sub-memory blocks B21*a*, B21*b*, B21*c*, and B21*d* of the first memory block MB0 of the cluster 13 until the data is read from the sub-memory blocks B01a, B01b, B01c, and B01d of the first memory block MB0 of the cluster 8 and until the data is read from the sub-memory blocks B02a, B02b, B02c, and B02d of the second memory block MB1 of the cluster 9. Also, the data stored in sub-memory blocks B22a, B22b, B22c, and B22d of the second memory block MB1 of the cluster 14 can be read after the data stored in the clusters 8, 9, and 13 have been read. Also, the data stored in the sub-memory blocks B23a, B23b, B23c, and B23d of the third memory block MB2 of the cluster 15 can be read after the data stored in the clusters 8, 9, 13, and 14 have been read.

Figure 3:
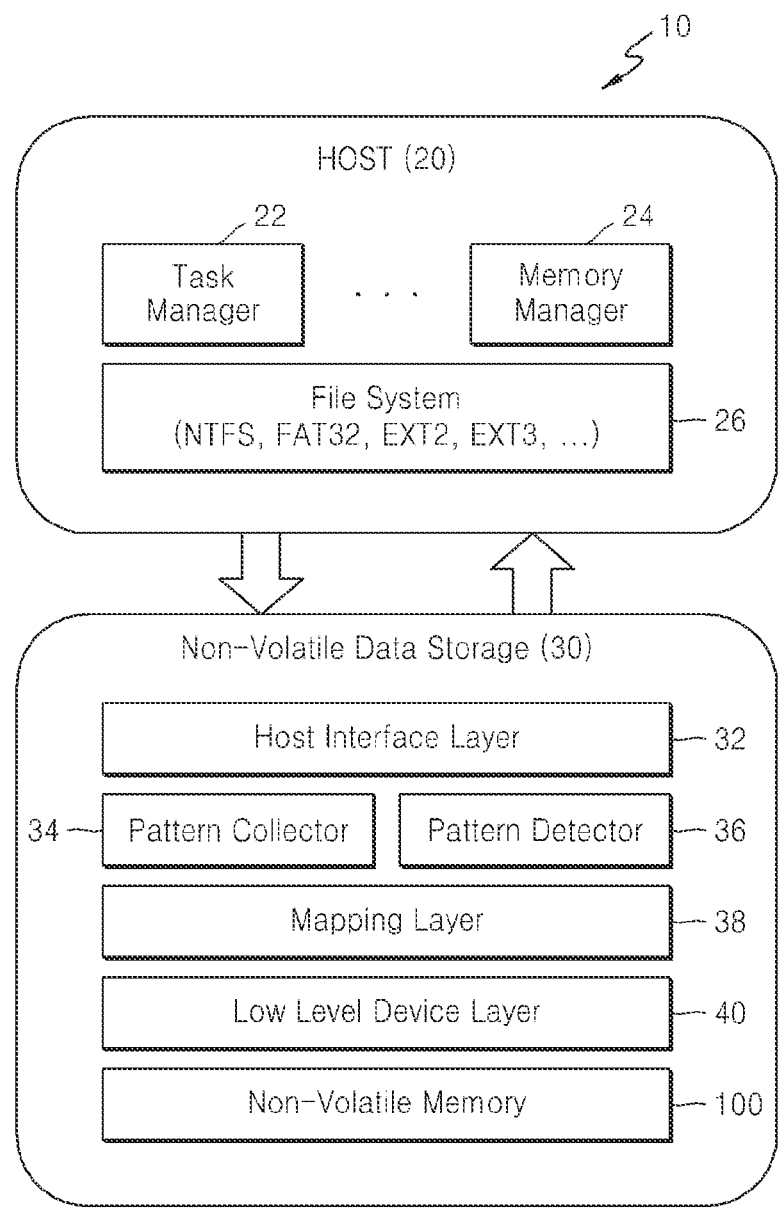
FIG. 3 is a view illustrating a computing system including a storage apparatus according to an embodiment of the present general inventive concept.

FIG. 3 is a view illustrating a computing system 10 including a host apparatus 20 and a storage apparatus 30 according to an embodiment of the present general inventive concept. The storage apparatus 30 may be a non-volatile data storage apparatus. As described above, the computing system 10 may be an electronic apparatus which may be a combination of the host apparatus and the storage apparatus 30. It is possible that the storage apparatus 30 may be installed inside the host apparatus 20 to form the electronic apparatus. It is also possible that the host apparatus 20 or the storage apparatus 30 may be the electronic apparatus to be connectable to the storage apparatus 30 or the host apparatus 20, respectively.

The host apparatus 20 includes a task manager 22 to determine a job (or an operation) to be performed and control an element thereof to perform the job, a memory manager 24 to perform a writing/reading/deleting operation of a non-volatile data storage apparatus 30, and a file system 26 to control the clusters as illustrated in FIGS. 1A, 1B, and 1C when the content of a file indicated by a file entry is edited, amended, changed or deleted.

The storage apparatus 30 includes a host interface layer 32 to communicate with the host apparatus 20, a pattern collector 34 to collect a user pattern, a pattern detector 36 to analyze a user pattern, a mapping layer 38 to map logical addresses and physical addresses, and a device driver layer 40 to drive a memory unit 100. The memory unit 100 may be a non-volatile memory unit. The memory unit 100 may have various N channel/X way architectures. As an example, the four channel/four way architecture can be used in the computing system 10.

Here, the host interface 32, the pattern collector 34, the mapping layer 38, and the device driver layer 40 may be referred to as a controller to control the memory unit 100 to write, read, or delete date, and to communicate with the host apparatus 20 to receive data to be stored in the memory unit 100 from the host apparatus 20, to transmit data read from the memory unit 100 to the host apparatus, or to receive a command to be used to control the memory unit 100 or the operation of the storage apparatus 30. The controller may have an additional memory unit to store data or program to perform a method of rearranging data in the memory unit 100 or storing data in the memory unit 100 according to an interleaving method which will be described later.

Figure 4:
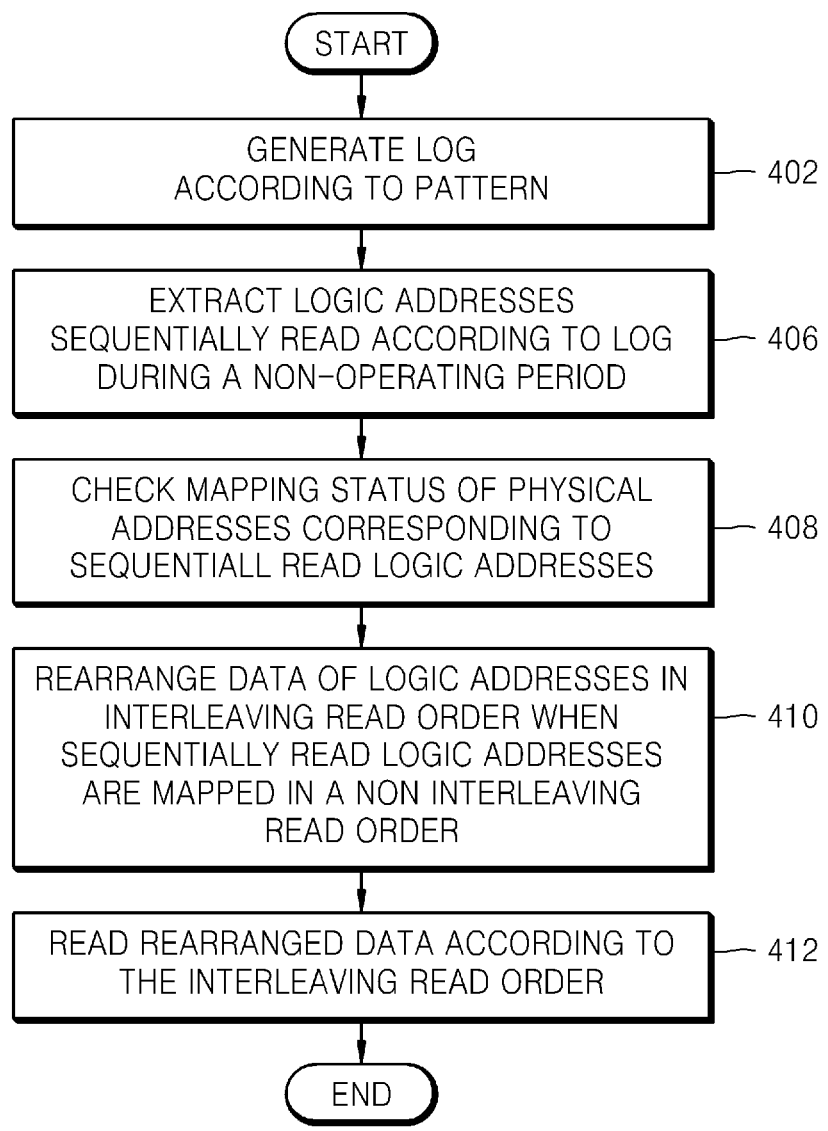
FIG. 4 is a flowchart illustrating a method of improving a reading and/or writing operation in a non-volatile memory according to an embodiment of the present general inventive concept.
Figures 5, 6A:
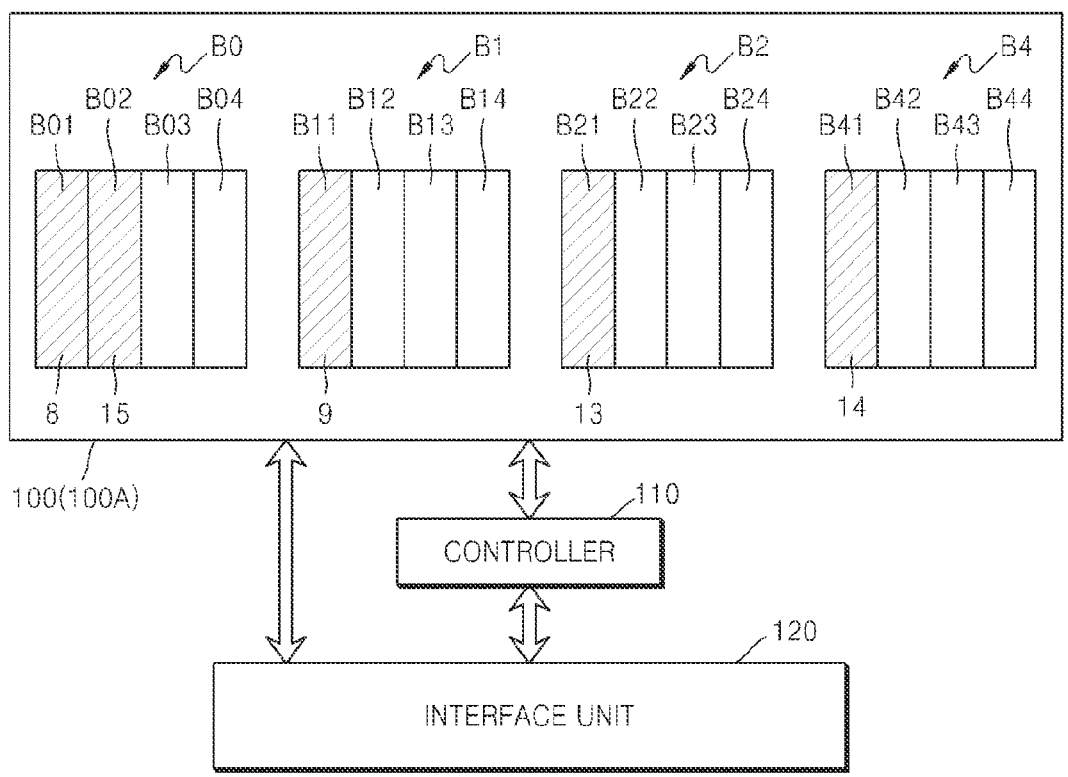
FIG. 5 is a view illustrating a log state generated in the non-volatile memory of FIG. 4.
FIGS. 6A and 6B are views illustrating a computing system to rearrange files and to sequentially read the rearranged files in a storage apparatus according to an embodiment of the present general inventive concept.

FIG. 4 is a flowchart illustrating a method of improving a reading and/or writing operation in a non-volatile storage apparatus according to an embodiment of the present general inventive concept. Referring to FIGS. 3 and 4, the pattern collector 34 collects patterns to generate one or more logs in operation 402. The generated logs may have a data structure of [starting logical address, sector counter] as illustrated in FIG. 5.

The pattern detector 36 extracts logical addresses sequentially read from the generated logs in operation 406. The pattern detector 36 may extract the logical addresses sequentially read from the generated logs according to a non-operating period in operation 406. The non-operating period may be a time period when the time period is longer than a reference period or when the time period is a time to perform an operation without interference of the host apparatus 20. The logical addresses of [200, 32], [300, 128], and [800, 128] are sequentially read according to the generated logs as illustrated in FIG. 5. When the sequentially read logs are detected, the pattern detector 36 checks out status of the physical addresses mapped from the logical addresses using the mapping layer 38 in operation 408.

If the sequentially read logical addresses are physically mapped not to be interleaved, the data of the logical addresses are rearranged to be physically interleaved, that is, data of the logical addresses are rearranged to be read in units which are physically interleaved in operation 410. For example, if the logical addresses 200, 300, and 800 are arranged in the third bank (bank2) of the memory unit 100 of FIG. 2B, the logical addresses 200, 300, and 800 are rearranged to the first bank (bank0), the second bank (bank1), and the third bank (bank2), respectively, in a rearranging operation. The rearranging operation can be performed to rearrange the logical addresses according to the above describe interleaving method (order) in an idle time period detected by the host interface layer 32. The idle time period may be a period during which there is no data input/output between the host apparatus 20 and the storage apparatus 30.

As illustrated in FIG. 2B, the memory unit 100 can perform the data input/output operation from the respective banks independently. That is, when a reading operation is performed in the first bank (bank0), another reading operation can be simultaneously independently performed in any other banks (bank1, bank2, and/or bank3). When the data corresponding to the logical addresses 200, 300, and 800 are rearranged to the first bank (bank0), the second bank (bank1), and the third bank (bank2), respectively, the data input/output operations can be simultaneously performed to read the data using the interleaving method (order) in operation 412.

For example, when the sequentially read logical addresses are in the sub-memory blocks of a same bank, data of the sequentially read logical addresses stored in the sub-memory blocks of the same bank are rearranged to one or more sub-memory blocks of one or more other banks. That is, the data are stored in the banks such that the sequential logical addresses are not in the same bank.

When data are stored in the memory unit 100, data corresponding to sequential logical addresses are arranged to be stored in different banks. The logical addresses 200 and 300 may be the sequentially read logical addresses. It is possible that the logical addresses 200, 300, and 800 may be the sequentially read logical addresses.

When a file is stored in the memory unit 100, data of the file is divided into one or more pieces of data, one or more logical addresses are assigned to the respective pieces of data of the file to correspond to the clusters, and at least two clusters corresponding to the logical addresses are in a same bank, the respective pieces of data are stored in different banks such that the respective pieces of data can be read in the interleaving method.

Figure 6B:
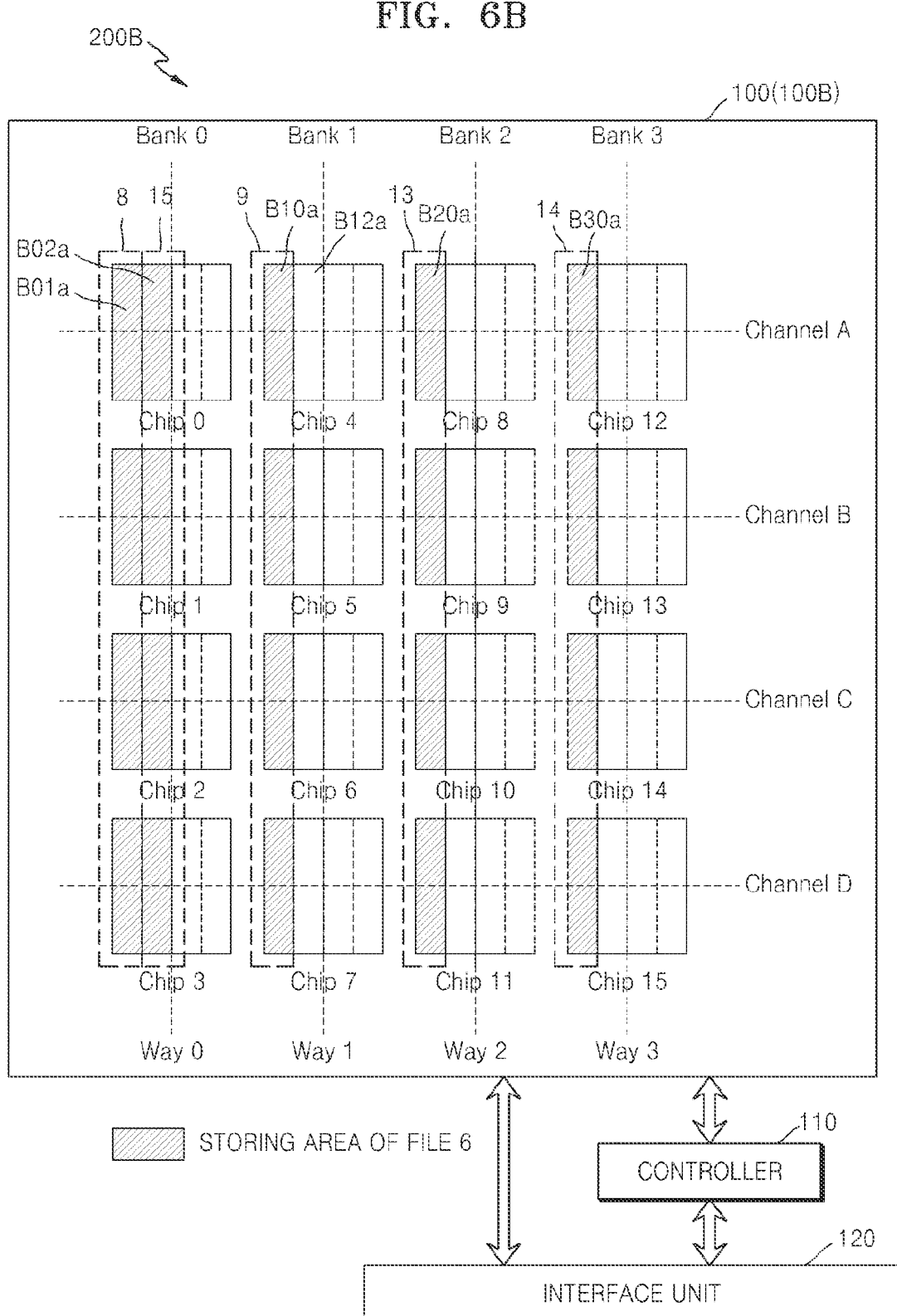

FIGS. 6A and 6B are views illustrating a computing system to rearrange files of FIGS. 2A and 2B, respectively, to sequentially read the rearranged files in a storage apparatus according to the interleaving method to correspond to according to an embodiment of the present general inventive concept. The storage apparatus may include a controller 110, an interface 120 to communicate with a host apparatus of the computing system, and a memory unit 100 (100A or 100B).

The memory unit of the storage apparatus may be a semiconductor package having a printed circuit board P where the memory units may be disposed to be electrically connected to the printed circuit board in the semiconductor package. The memory units are disposed to be spaced apart from each other on the printed circuit board. The memory units are disposed to overlap over the printed circuit board.

Referring to FIGS. 2A, 6A, and 6B since clusters 8-9 and 13-15 are sequential to store data of the sixth file (file6), at least two sequential clusters of the sequential clusters 8-9 and 13-15 are not arranged to be stored in a same bank but arranged to be stored in different banks when at least one other bank is available as free cluster. Accordingly, the physical addresses of the logical addresses of the sixth file (file6) can be changed to correspond to memory blocks of different banks. For example, the cluster 8 is assigned to be stored in the memory block B01 of the first bank B0, the cluster 9 is assigned to be stored in the memory block B11 of the second bank B1, the cluster 13 is assigned to be stored in the memory block B21 of the third bank B2, the cluster 14 is assigned to be stored in the memory block B31 of the fourth bank B3, and the cluster 15 is assigned to be stored in the memory block B02 of the first bank B0, according to an interleaving method (order).

When reading the sixth file (file6), data stored in the memory blocks B01, B11, B21, and B31 are simultaneously read and then data stored in the memory block B02 is read, so that the data corresponding to clusters 8-9 and 13-15 can be output. sequentially. The storage apparatus of claim 4, wherein the data are read from the memory units at a first speed, and the rearranged data are read from the memory units at a second speed which is faster than the first speed.

According to the present general inventive concept as described above, the data of the sixth file (file6) stored as illustrated in FIG. 2A or 2B are read from the memory units for a first period, and the rearranged data of the sixth file (file6) stored as illustrated in FIG. 6A or 6B are read from the memory units for a second period which is shorter the first period since the reading operation of the rearranged data of FIG. 6A or 6B does not require a waiting period which is required in the reading operation of the data of FIG. 2A or 2B. The data of the sixth file (file6) are rearranged in the memory units without deleting any portion of the data of the sixth file (file6) from the memory units. The data of the sixth file (file6) stored in the memory units is a first data amount, and the rearranged data of the sixth file (file6) stored in the memory units is a second data amount which is the same as the first data amount.

FIG. 7 is a flowchart illustrating a method of improving a reading and/or writing operation in a non-volatile memory according to an embodiment of the present general inventive concept. Referring to FIGS. 3 and 7, a controller of the storage apparatus 30 determines a time period taken from a time when the host interface layer 32 receives a last command, for example, a SATA command, from the host apparatus 20, and determines whether the time period is an effective time period, that is, when the time period is longer than a reference period or when the time period is a time to perform an operation without interference of the host apparatus 20. When the time period is the effective time period, the host interface layer 32 analyzes meta data of the file system 26 of the host apparatus 20 in operation 702. The meta data of the file system 26 may include a name of a file, a cluster list to form the file, a date when the file has been accessed, a characteristic of the file, information on the file, etc. The file system 26 may include NTFS, FAT 16, FAT 32, EXT2, etc. In the present embodiment, cluster information to be used to form a file is extracted using information from the meta data (meta information) of the FAT file system in operation 704.

Figure 8:
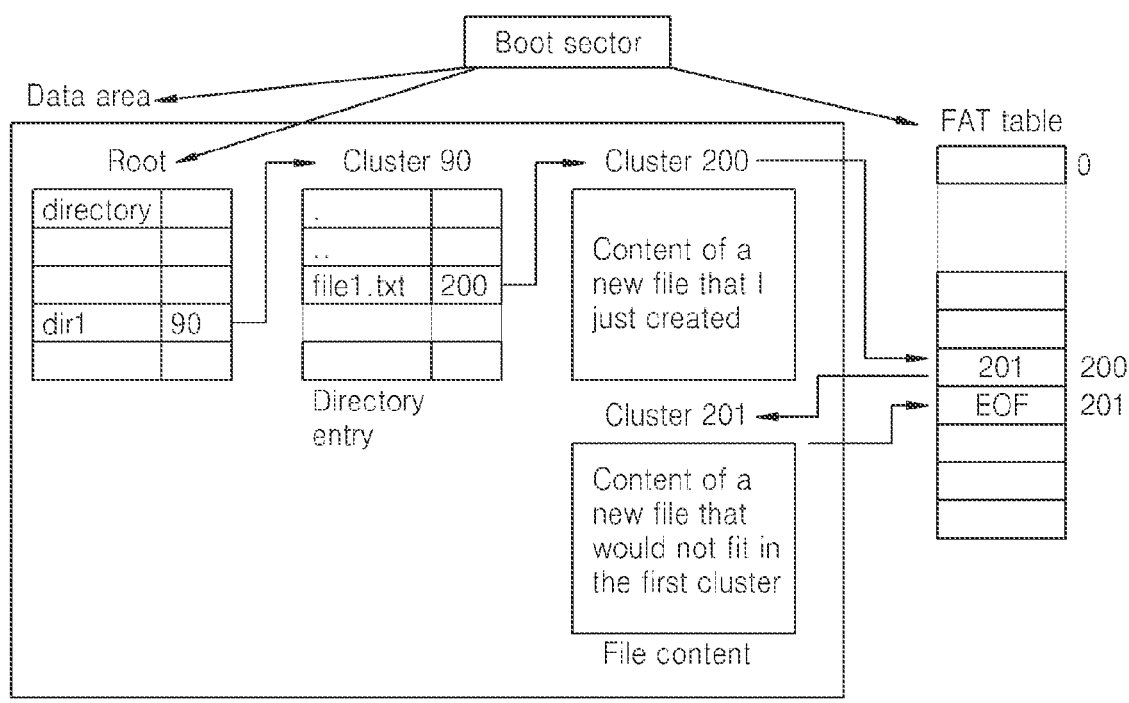
FIG. 8 is a block diagram illustrating a file allocation table in a storage apparatus of a computing system.

For example, cluster information and a structure of clusters forming a first file (file1.txt) which exists in a first directory (dir1) can be extracted using a file allocation table (FAT) file system as illustrated in FIG. 8. Referring to FIG. 8, a boot sector may include a type of a file system, a size of a file allocation table (FAT), the total number of sectors, a location of a starting cluster, the number of sectors corresponding to a cluster, etc. The boot sector may include data area, a directory, and the FAT. The FAT finds a location of a cluster assigned with a file and is a block to store status of connection of clusters. The root directory is an upper directory of a directory or files.

A cluster number of the root directory can be obtained using information on a BIOS Parameter blocks (BPB) of a boot sector. Data of a logical address mapped on the cluster number of the root directory can be read from the non-volatile storage apparatus. When the read data are analyzed according to a directory entry format of the FAT file system, it is determined that the cluster number of a first directory (dir1) is 90. When data of the logical address mapped on the cluster number 90 is read from the non-volatile storage apparatus, it is determined that the first file (file1.txt) of the first directory is stored in the cluster number 200. When the host apparatus reads the cluster number 200 and generates a command to refer to the cluster 201 according to an index 200 of the FAT. When the cluster 201 is read by referring to the index 201 of the FAT and the cluster 201 is an end of file (EOF), the reading operation of reading meta data of the file system is terminated.

Referring to FIGS. 7 and 8, mapping status of physical addresses corresponding to the cluster information is checked in operation 706. That is, in the FAT file system of FIG. 8, the status of physical addresses mapped on the cluster numbers 200 and 201 of the first file (file1.txt) extracted from the FAT and the directory entry is checked in operation 706. If the physical addresses mapped in cluster numbers are mapped in a non-interleaving read order, data of respective cluster numbers are rearranged in an interleaving order in operation 708. That is, if the physical addresses mapped on the cluster numbers 200 and 201 are not interleaved, data stored in the cluster numbers 200 and 201 are rearranged to be read in an interleaving unit in operation 708. For example, data stored in cluster numbers 200 and 201 are assigned in the first bank (bank0) of the non-volatile memory unit 100 as illustrated in FIG. 2A or 2B, data stored in the first bank (bank0) are rearranged in the first bank (bank0) and the second bank (bank1). Accordingly, when the first file (file1.txt) is read, it is possible to simultaneously read the cluster 200 and the cluster 201. That is, data of cluster 200 and data of the cluster 201 can be read simultaneously, and the sequential cluster numbers can be read in a sequential order.

Here, the arranging of data according to an interleaving method (order) represents that data of clusters having a sequential cluster numbers are not arranged to be stored in the sub-memory units of a single bank, but arranged to be stored in different banks. Since the data of sequential cluster numbers are not sequentially arranged in sequential sub-memory units of a single bank, the data of the sequential cluster numbers are sequentially distributed to corresponding sub-memory units of different banks, that is, the data of the sequential cluster numbers are interleaved throughout the banks without storing data having sequential cluster numbers in the same bank. Accordingly, data stored according to the interleaving method (order) in corresponding sub-memory units of different banks can be simultaneously read, and the read data of sequential cluster numbers can be sequentially output.

FIG. 9 is a flowchart illustrating a method of improving a reading and/or writing operation in a non-volatile memory according to an embodiment of the present general inventive concept. The method may include reading information on free clusters of a file system in operation 902, checking mapping status of physical addresses corresponding to logical address of the free clusters in operation 904, changing physical addresses mapped in the free clusters according to a sequential interleaving order in operation 906, and/or writing data assigned to the free clusters according to the sequential interleaving order in operation 908.

Referring to FIGS. 3 and 9, a non-volatile storage apparatus 30 reads information on free clusters of the file system 26 of a host apparatus 20 in operation 902. When one or more files of the file system are deleted, the host apparatus 20 releases clusters corresponding to the deleted files as free clusters, and transmits logical addresses which have been mapped to the released clusters using a trim command, to the storage apparatus 30. The trim command may be a command provided by S-ATA protocol.

When the host apparatus 20 transmits information representing that portions of [200, 8], [300,8], and [800,8] in the file system are free clusters, to the storage apparatus 30, the storage apparatus 30 checks the status of physical addresses mapped with the logical addresses 200, 300, and 800 using the mapping layer 38 in operation 904. For example, the logical addresses 200, 300, and 800 are mapped to be disposed in the first bank (bank0) of the memory unit 100, mapping information can be changed such that the logical addresses 200, 300, and 800 can be mapped to be sequentially arranged in the first bank (bank0), the second bank (bank1), and the third bank (bank2), respectively, in operation 906. That is, physical address of the memory unit 100 mapped on the logical addresses 200, 300, and 800 of the free clusters are rearranged to be interleaved in the banks. The file system sequentially assigns the free clusters of a free cluster list to correspond to the banks, and the data assigned to the free clusters are written in the interleaving method (order) in operation 906.

According to the fragmentation of the file system, as illustrated in FIG. 2A or 2B, the sixth file (file 6) can be written in a predetermined order or in a non-predetermined order. Here, the physical address mapped to the logical addresses of the free clusters 8-9, and 13-15 of FIG. 1B can be sequentially respectively rearranged to the first through fourth banks (bank0, bank1, bank2, and bank3) as illustrated in FIG. 9 such that the sixth file (file6) corresponding to the free clusters 8-9 and 13-15 can be written in the predetermined order as illustrated in FIG. 6A or 6B.

FIG. 10 is a view illustrating a method of improving a reading and/or writing operation in a non-volatile memory according to an embodiment of the present general inventive concept. Referring to FIGS. 3 and 10, the method may include reading bitmap information of a file system in operation 1002, changing physical addresses such that physical addresses mapped in non-used clusters are sequentially interleaved in operation 1004, and/or writing data assigned to the non-used clusters according to an interleaving order in operation 1006.

For example, the host apparatus 20 or the storage apparatus 30 reads or analyzes bitmap of a WINDOWS file system (NTFS) which may have a large capacity of a file system, in operation 1002. The WINDOWS file system divides a memory unit space into areas of a node, a directory entry, a data block, etc., when a file system is generated, and assigns a bitmap area to the respective ones. The bitmap area indicates which one of clusters is used or non-used. In this case, mapping information is changed such that the mapping addresses corresponding to the non-used clusters are sequentially interleaved with respect to the banks in operation 1004. Accordingly, data assigned to the non-used clusters are written in the interleaving method (order) in operation 1006.

Figure 11A:
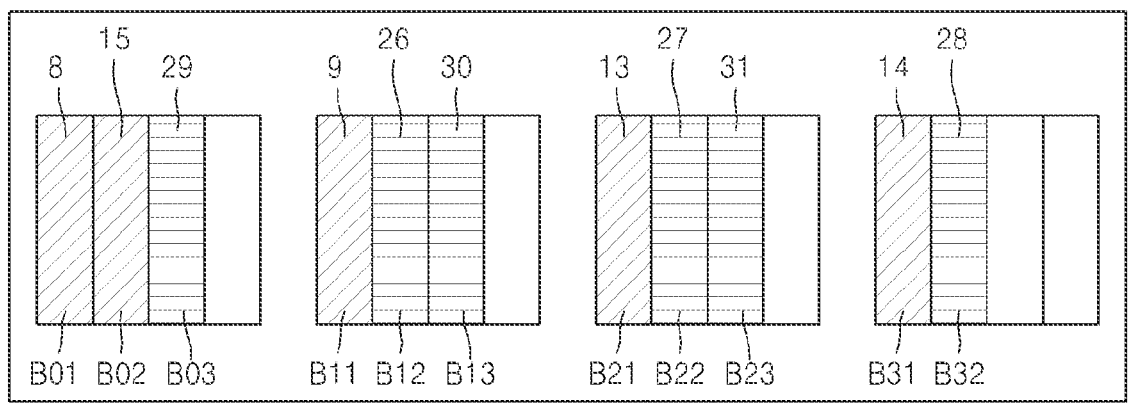
FIGS. 11A and 11B is a view illustrating a memory unit of a storage apparatus to store new data corresponding to free clusters in an interleaving method according to an embodiment of the present general inventive concept.
Figure 11B:
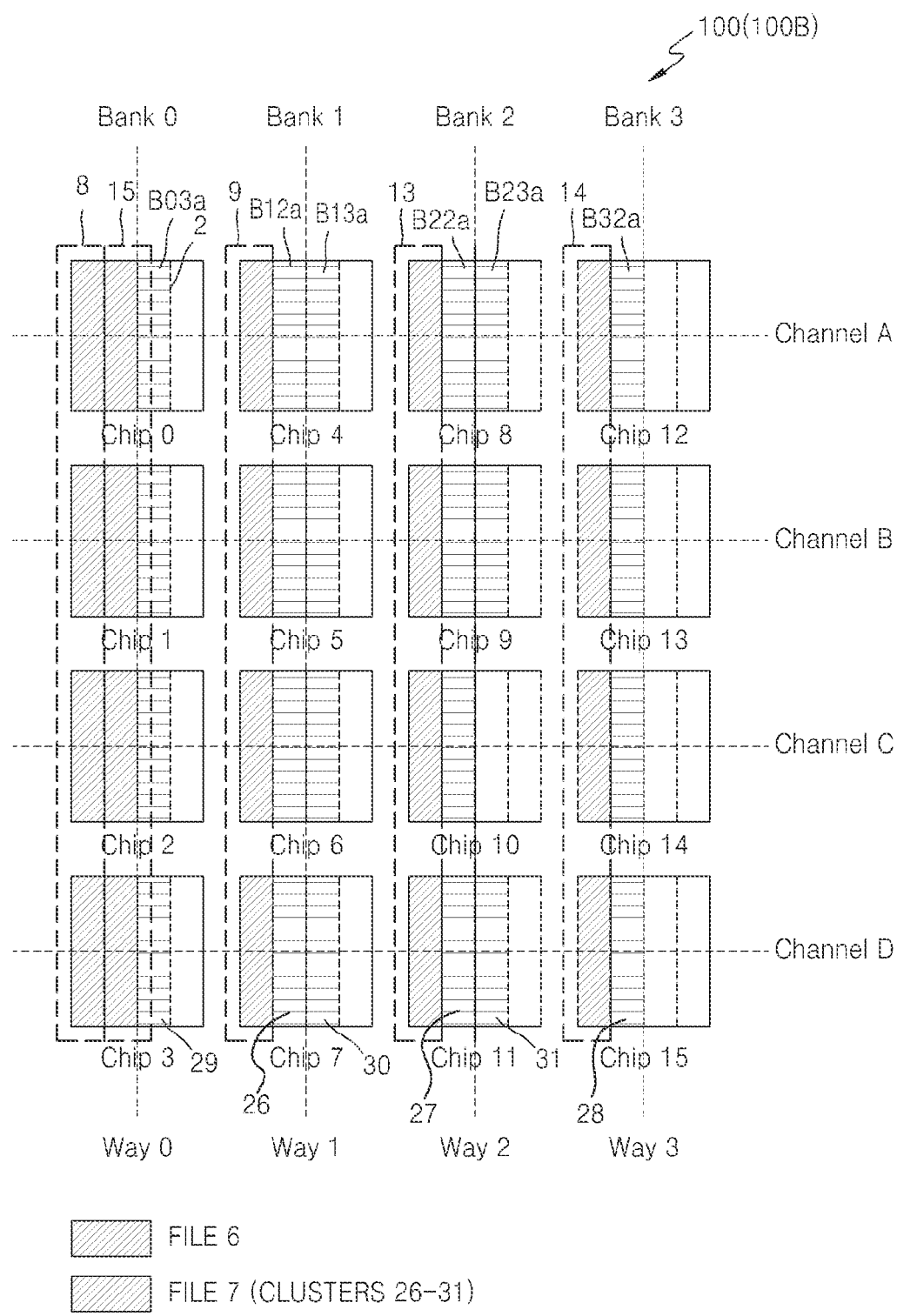

FIGS. 11A and 11B is a view illustrating a memory unit of a storage apparatus to store new data corresponding to free clusters in an interleaving method according to an embodiment of the present general inventive concept.

Referring to FIGS. 6A, 11A, and 11B, when a new file, for example, a seventh file (file7), is stored, a number of free clusters, for example, six clusters 26-31, are required to store the seventh file according to a size of the seventh file. When the cluster numbers 26-31 are sequential, at least two sequential clusters are not assigned to be stored in a same bank, but assigned to be stored in different banks. Accordingly, the six clusters 26-31 may be assigned to memory blocks B12, B22, B32, B03, B13, and B23 respectively sequentially according to an interleaving method (order). When reading the data of the seventh file, data of the memory blocks B12, B22, B32 are simultaneously read and then data of the memory blocks B03, B13, and B23 are simultaneously read, such that data of clusters B03, B13, and B32 are sequentially output.

Figure 12:
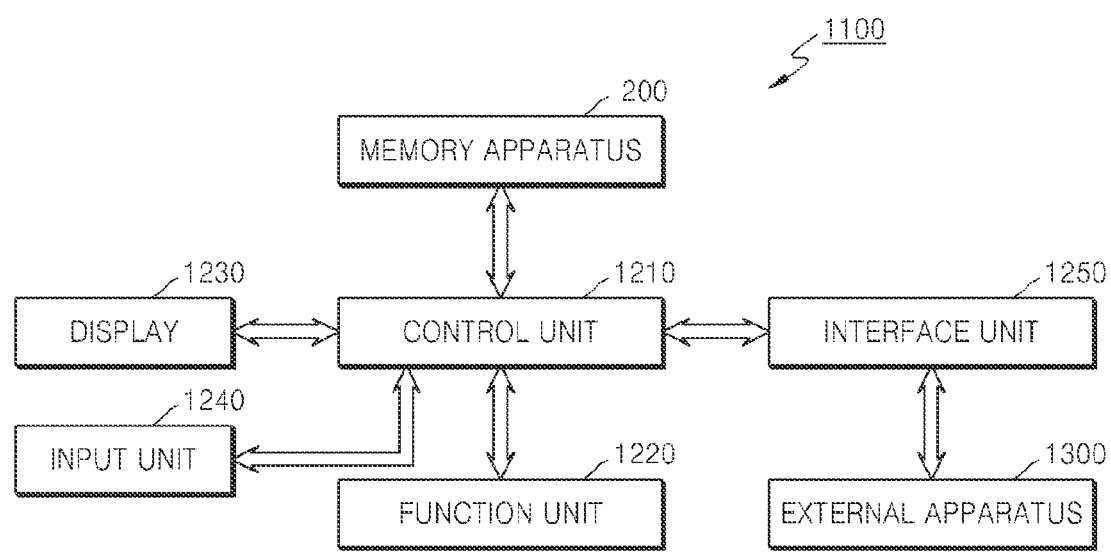
FIG. 12 is a block diagram illustrating a computing system to improve a reading and/or writing operation in a storage apparatus according to an embodiment of the present genera inventive concept.

FIG. 12 is a block diagram illustrating a computing system 1200 to improve a reading and/or writing operation in a storage apparatus according to an embodiment of the present genera inventive concept.

The computing system may be an electronic apparatus, for example, a mobile device, a wireless telephone, a personal computer, a laptop computer, a computer apparatus, an image processing and/or forming apparatus, a display apparatus, to process data to generate at least image data, sound data, and/or interface data to be transmitted to another electronic apparatus. The electronic apparatus may have a storage apparatus installed inside thereof or may be connected to the storage apparatus to store data therefrom or to write data therein using the file system. The examples of the electronic apparatus are well known, detailed descriptions thereof are omitted.

The computing system may include a control unit 1210, a storage apparatus 200, an interface 1250 to communicate with an external apparatus 1300, a function unit 1220, a display unit 1230, and an input unit 1240. The control unit 1210 controls operations of units of the computing system 1200, and may receive data from the input unit 1240, the function unit 1220, and/or the external apparatus 1300 through the interface unit 1250 to store the received data in the storage apparatus 200, or transmit data read from the storage apparatus 200 to the function unit 1220 or the external apparatus 1300 through the interface unit 1250. The function unit 1220 may perform operations of the computing system 1200, such as, processing the data to generate new data, generating a video or sound signal from the data, forming an image according to the data, communicating with the external apparatus 1300 through the interface unit 1250 using the data, etc. The display unit 1230 may be installed inside the computing system 1200 or may be installed outside the computing system 1200 to be detachably connectable to the computing system 1200 through a wired or wireless communication line. The input unit 1240 may be a touch screen or a key board to input data or command to the controller through an image displayed in the display unit 1230 or may be formed with the display unit 1230. The function unit 1220, the display unit 1230, the input unit 1240, and the interface unit 1250 are well known, and thus detailed descriptions will be omitted.

The storage apparatus described in FIGS. 2A through 11B may be used as the storage apparatus 200. The control unit 1210 controls the storage apparatus 200 to perform a reading/ writing operation according to an interleaving method as describe above. The control unit 1210 may include the task manager 22, the memory manager 24, and the file system 26 of the storage apparatus 30 of FIG. 3. The storage apparatus 200 may have a structure as illustrated in FIG. 3. It is possible that the controller of the storage apparatus 30 of FIG. 3 can be combined with the control unit 1210 of the computing apparatus 1200 of FIG. 12.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A reading method of a non-volatile data storage apparatus connected to a host, the method comprising:
   generating logs by collecting patterns of repeated occurrences of data stored in a specific sequence of files;
   extracting from the logs the logical addresses of each file in the specific sequence;
   checking states of physical addresses of the non-volatile data storage apparatus mapped to the extracted logical addresses;
   when the states of the physical addresses of the non-volatile data storage apparatus are in a non-interleaving reading order, rearranging, during an idle time of the host, the physical addresses such that the data of the files in the specific sequence are configured to be read sequentially and in an interleaving manner; and
   reading the data of the files in the specific sequence in the interleaving manner.

2. The reading method of claim 1, wherein the extracting from the logs the logical addresses are performed during the idle time of the host.

3. The reading method of claim 1, wherein:
   the data comprises clusters, having the logical addresses, to be stored in memory banks in order; and
   the rearranging of the physical addresses comprises assigning a first portion of the clusters to first available memory blocks of different memory banks and then assigning a second portion of the clusters to a next available memory block of the different memory banks after the first available memory blocks of the different memory banks are assigned with the first portion of the clusters as in the interleaving manner.

4. The reading method of claim 3, wherein the reading comprises reading the first portion of the stored clusters simultaneously.

5. The reading method of claim 3, wherein the reading comprises reading the first portion and the second portion of the stored clusters sequentially.

6. The reading method of claim 1, wherein:
   the data includes clusters that correspond to the logical addresses; and
   the reading comprises simultaneously reading the clusters that correspond to the logical addresses since the clusters of the data are stored in the interleaving manner.

7. The reading method of claim 1, wherein:
   the data comprises a sequence of clusters to be stored in memory banks in order; and
   the rearranging of the physical addresses comprises rearranging adjacent clusters to correspond to different physical addresses that correspond to different memory banks in the interleaving manner such that the adjacent clusters of stored data are configured to be simultaneously read.

8. The reading method of claim 1, wherein:
   the data includes a sequence of clusters having the logical addresses that correspond to adjacent physical addresses of a same memory bank; and
   the rearranging of the physical addresses comprises causing the clusters that correspond to the adjacent physical addresses to correspond to physical addresses that correspond to different memory banks in the interleaving manner such that the data of the clusters, stored at different physical addresses that correspond to the different memory banks, are configured to be simultaneously read.

9. A non-transitory computer-readable medium to contain computer-readable codes as a program to execute the method of claim 1.

10. A reading method of a non-volatile data storage apparatus connected to a host, the method comprising:
    analyzing meta information in a file system of the host;
    extracting, from the meta information, cluster information about clusters of a file;
    checking states of current physical addresses of the non-volatile data storage apparatus mapped to the extracted cluster information;
    in response to a determination that the states of the current physical addresses of the non-volatile data storage apparatus are in a non-interleaving reading order, causing the extracted cluster information to be mapped to different physical addresses so that data previously stored in the clusters of the file are configured to be read in an interleaving manner; and
    reading the data previously stored in the clusters of the file in the interleaving manner.

11. The reading method of claim 10, wherein the meta information is extracted from a file allocation table (FAT) table and a directory entry in a FAT file system.

12. The reading method of claim 10, wherein the meta information is analyzed in an idle time of the host.

13. A writing method of a non-volatile data storage apparatus connected to a host, the method comprising:
    in response to a file in a file system of the host being deleted, reading information about free clusters in the file system of the host;
    checking states of current physical addresses of the non-volatile data storage apparatus mapped to logical addresses of the free clusters, when in response to a determination that the states of the current physical addresses of the non-volatile data storage apparatus are in a non-interleaving reading order, causing the logical addresses to be mapped to different physical addresses so that the free clusters are configured to be sequentially interleaved; and writing the data allocated to the free clusters in an interleaving manner.

14. The writing method of claim 13, wherein the information about the free clusters is logical addresses that map to released clusters that correspond to a deleted file in the file system.

15. The writing method of claim 13, wherein the host informs the non-volatile data storage apparatus of the information about the free clusters by using a trim command provided by a serial ATA (SATA) protocol.

16. A writing method of a non-volatile data storage apparatus connected to a host, the method comprising:

analyzing meta information in a file system of the host, the file system configured to divide a memory unit space into areas of a node, a directory entry, and a data block;

causing physical addresses of the non-volatile data storage apparatus mapped to logical addresses of clusters that are not in use, identified from the meta information, to be sequentially interleaved; and writing, in an interleaving manner, data allocated to the clusters that are not in use.

17. The writing method of claim 16, wherein the meta information is bitmap information in a Windows file system (NTFS).

18. The writing method of claim 16, wherein:

the non-volatile data storage apparatus comprises a plurality of memory banks configured to be read simultaneously in a reading operation; and the causing the physical addresses comprises causing the clusters that are not in use that correspond to adjacent physical addresses in a same memory bank to correspond to different physical addresses that correspond to different memory banks.

19. The writing method of claim 16, wherein:

the non-volatile data storage apparatus comprises a plurality of memory banks configured to be read simultaneously in a reading operation; and the writing comprises writing the data allocated to the clusters that are not in use that correspond to a sequence of logical addresses to different physical addresses that correspond to different memory banks.

20. A non-transitory computer-readable medium to contain computer-readable codes as a program to execute the method of claim 16.

* * * * *